Aug. 2, 1955

A. W. FRESHMAN 2,714,380

SPATIAL VECTOMETER FOR VECTORCARDIOGRAPHY

Filed April 3, 1953

INVENTOR.
Alexander W. Freshman

BY
P. W. Lamphere
ATTORNEY

Aug. 2, 1955    A. W. FRESHMAN    2,714,380
SPATIAL VECTOMETER FOR VECTORCARDIOGRAPHY
Filed April 3, 1953    2 Sheets-Sheet 2
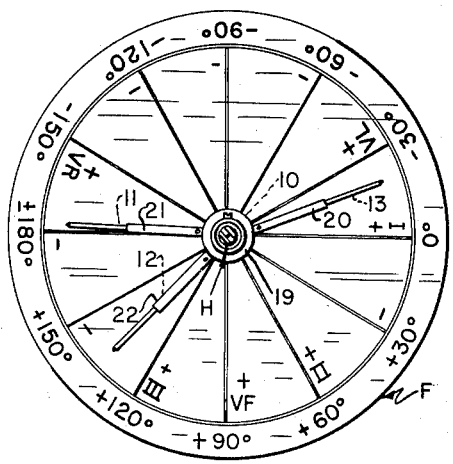
FIG. 4.
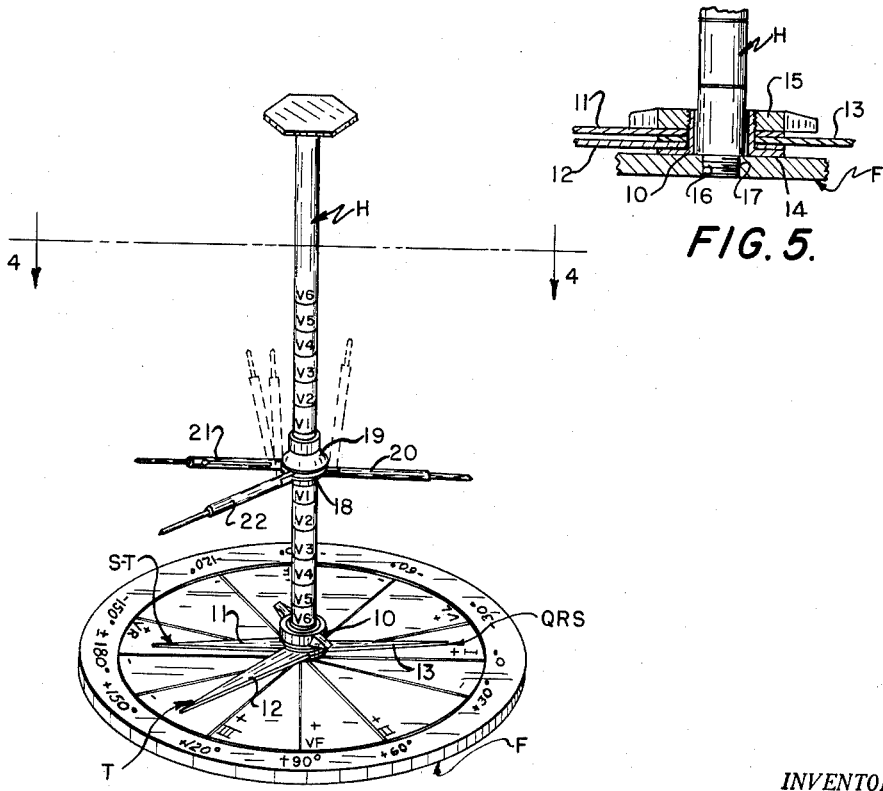
FIG. 5.
FIG. 3.
INVENTOR.
Alexander W. Freshman
BY
ATTORNEY

United States Patent Office 2,714,380
Patented Aug. 2, 1955

2,714,380

SPATIAL VECTOMETER FOR VECTOR-CARDIOGRAPHY

Alexander W. Freshman, Denver, Colo.

Application April 3, 1953, Serial No. 346,610

8 Claims. (Cl. 128—2.06)

This invention relates to the analysis of electrocardiograms (hereafter referred to as ECG), and more particularly to the vector method of analysis which involves the electrical forces generated by the heart, their magnitude and direction and the relationship to a specific axis. The term commonly applied is spatial vector analysis, which is placing the electrical forces generated by the heart in space for interpretation of each of the conventional electrocardiograph leads employed to obtain the ECG.

One of the best known and authoritative books on spatial vector methods for interpreting ECG is that by Dr. Robert P. Grant and Dr. E. Harvey Estes, Jr., entitled "Spatial Vector Electrocardiography," 1951, The Blakiston Company, New York, N. Y. In this book the spatial vector method is fully discussed and illustrated and its advantages over empirical methods based on interpretation of "pattern" or contour of the deflections on individual leads is fully discussed. However, one disadvantage in the spatial vector method resides in the necessity of mental synthesis.

One of the objects of my invention is to produce an instrument whereby an ECG can be analyzed to produce visual spatial vectors, thus eliminating the necessity of memorizing the variety of patterns.

A further object is to produce an instrument that can be employed to visually interpret, by the spatial vector method, any ECG.

Yet another object is to produce an instrument for visual interpretation by the spatial vector method of an ECG in which the interpretation of the front plane can be accomplished by settling of arms or "vectors" in a plane about a common axis, which represents the horizontal plane to be interpreted, and other arms or vectors are mounted at a point on this axis for movement to extend in any direction from the point which, during the interpretation, can be set to represent the direction of the electrical forces causing the deflection of T, QRS or S–T of the ECG.

Other objects of my invention will become apparent from the following description taken in connection with the accompanying drawings in which.

Figure 1:
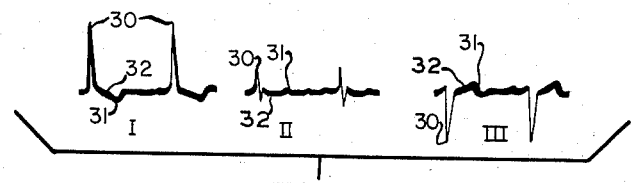
Figure 1 is an illustration of an ECG showing the recorded deflections of each of the three limb leads (indicated as leads I, II and III) of an electrocardiogram using bipolar electrodes, such being axial measurements of the electrical field in the frontal plane.
Figure 2:
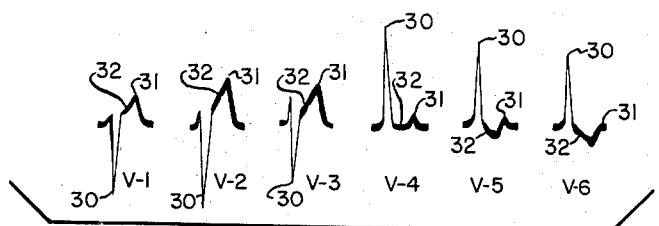
Figure 2 is an illustration of an ECG showing the recorded deflections of the six precordial V unipolar lead electrode positions taken around the left side of the chest over the heart by the electrocardiograph, such being measurements of the electrical field in the horizontal plane.
Figure 6:
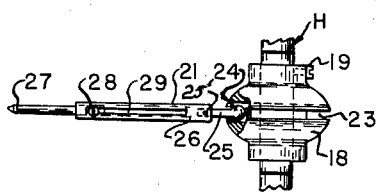
Figure 7:
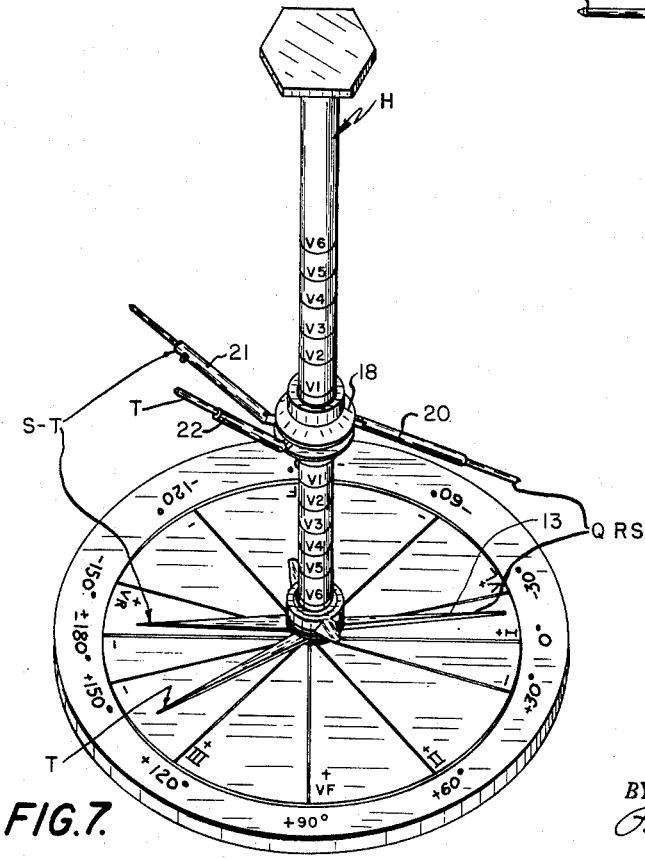

Figure 3 is a view of a spatial vectometer instrument embodying my invention and being shown by way of example, said instrument having a setting of the vector arms at its base plate representing the three ECG recorded deflections in the frontal plane as illustrated in Figure 1, said figure also showing the first setting of the vector arms on the vertical rod to be in the same radial direction from the vertical rod as the lower frontal plane vector arms;

Figure 4 is a top view taken on the line 4—4 of Figure 3 showing the positions of the various companion arms in the same vertical plane;

Figure 5 is an enlarged view of the base plate hub and the vector arms showing details of mounting;

Figure 6 is a view of the hub on the vertical rod showing details of a vector arm and its mounting; and Figure 7 is a view of the final setting of the instrument to visually represent by vector arms in space the direction and magnitude of the deflections of the QRS, S–T and T electrical forces of the heart as obtained by the ECG record of Figures 1 and 2.

Referring to the drawings in detail and first to Figures 3, 4 and 5, my spatial vectometer instrument shown by way of example will first be described in detail as to its structure, and thereafter an illustration of its use in producing a visual illustration in analyzing a typical ECG as shown in Figures 1 and 2 which indicates a left ventricular strain of the human heart. The latter F indicates a circular plate which forms the base of the instrument. At the center thereof is an upstanding hub member 10 suitably secured to the plate and provided with an axial bore into which is positioned the bottom of a rod H to extend upwardly from the plate a substantial distance and being provided with a hexagonal head to facilitate the attaching and detaching of the plate and rod whenever such is desirable for packaging, transporting, etc. The base plate is to represent the frontal plane for the ECG and the rod H is to represent the anterior-posterior axis of the horizontal plane which is at right angles to the frontal plane.

The center of the circular plate at the hub will be the so-called isoelectric or zero point in the front plane electrical field. The base plate is marked off by radial lines at every 30 degrees to provide the hexaxial reference figure for the frontal plane of the body, all formed by the superposing of the axes of the bipolar and unipolar limb leads. The bipolar limb lead axes are indicated by the Roman numerals I, II and III and the unipolar limb lead axes are indicated by the letters $V_L$, $V_R$ and $V_F$. The polarity of the leads is also indicated on the hexaxial reference figure of the base plate by plus and minus signs. The hexaxial reference figure is all explained in detail in the Grant et al. book above referred to and also the manner of its use with respect to the spatial vector method of interpretation of the ECG (see chapter 2). This book also discusses the manner in which the QRS, T and S–T deflections or waves (all well known in cardiography) of the ECG are analyzed and the mean vectors determined therefrom so the direction of the vectors can be indicated on the hexaxial reference figure, depending on polarity of the leads. A detailed discussion of this is not believed to be necessary here, since it is all common knowledge in connection with spatial vector electrocardiography. With the use of my improved instrument, however, the means vectors need not be plotted on the hexaxial reference figure, but can be indicated visually on the base plate by the three vector arms 11, 12 and 13, with each having an end attached to the hub and capable of being positioned to extend radially outward toward the periphery of the base plate.

In Figure 5, details of the hub and a vector arm mounting are shown. It will be noted the hub 10 has an annular flange 14 at its base and each vector arm has an opening to fit over the hub with the arms in superposed relation. A clamping nut 15 is screwed on the hub and acts to clamp the hubs of the vector arms between it and the flange 14. The clamping action will only be such as to hold the arms in place and yet allow their movement on the hub by hand force. With this construction and mounting of each vector arm, it is seen each arm may be moved about the hub and rod as an axis and set to point in any direction from said axis. It will be noted that the hub 10, by its flange 14, is rigidly secured to the base plate F in any desired manner and the rod H extends loosely through the hub bore. The rod H on its lower end carries a threaded reduced end 16 and this end screws into a threaded hole 17.

At a predetermined distance up on the rod H there is another hub member 18 which is fixed to the rod as by a set screw 19 and this hub member has vector arms 20, 21 and 22 mounted thereon. Above and below this hub, which represents the isoelectric or zero point in the electrical field of the horizontal plane indicated by the rod H, are markings on the rod equally spaced apart. There are six markings above and six markings below the hub and these are indicated as $V_1$, $V_2$, $V_3$, $V_4$, $V_5$ and $V_6$ for the six deflections on the ECG corresponding to the six precordial V lead electrode positions. The V positions above the hub are to determine anterior directions of deflection of the ECG and those below the hub are to determine posterior directions of deflections of the ECG.

In Figure 6, details of the hub member 18 and a vector arm mounting are shown. It will be noted the hub member has an annular groove 23 having a narrowed opening. Each vector arm, such as the arm 21 shown, has a ball 24 on one end part 25 which fits into the annular groove with a frictional action. This end part just outside the groove has a hinged connection 25' with a tubular body part 26 of the arm, said hinge connection being on a horizontal axis whereby part 26 may be tilted, and slidable in the outer end of this body is a pointer member 27 which may be of a contrasting color. A screw 28 carried by the pointer member and slidable in a longitudinal slot 29 of the body permits longitudinal adjustment of the pointer member in the body. With this construction and mounting of each vector arm, it is seen the arm may be moved circumferentially in the groove as desired, rotated on its own axis and swung about the hinge joint. Thus, the vector arm can be set to point in any direction from the hub axis.

In order to fully understand how my new spatial vectometer instrument is operated to give visual interpretation of an ECG being analyzed, reference is had to a typical ECG record shown in Figures 1 and 2 by which a left ventricular strain of the heart is indicated. Figure 1 shows the waves recorded as a result of the I, II and III limb leads, these being in the frontal plane. The QRS deflection of these waves is indicated by the numeral 30, the T deflection is indicated by the numeral 31 and the S-T deflection by the numeral 32, this nearly always being isoelectric or nearly so. It will be noted that the QRS or 30 deflection is positive as to lead I, positive and negative with a positive difference for lead II and negative for lead III. With this reading the QRS vector arm, which can be selected as arm 13, can now be set on the base plate on which is represented the hexaxial reference figure. Before beginning, the base plate F is placed before the individual, as shown in Figures 3 and 7, and the top of the plate corresponds to the same view as when looking at the chest from the front of the individual with the various axes in their proper relation.

The QRS arm 13 is now set at the position shown in Figures 3 and 7. The reason for this is found in the Grant et al. book on Spatial Vector Electrocardiography at pages 7 to 9, wherein the electrocardiographic deflections are discussed. A vector will be at right angles to an axis of a lead when there is no deflection or amplitude recorded. A vector will be parallel to an axis of a lead when there is maximum deflection or amplitude recorded. A vector will be oblique to the axis of a lead when there is a smaller deflection or amplitude less than maximum. The side of the axis that the deflection is on determines whether it is positive or negative.

With all this knowledge, it is seen that lead I has a near maximum QRS deflection which is positive. Thus, this indicates that the vector must be on the positive side of the I axis and nearly parallel thereto as the current force is strong. Lead II has a QRS deflection which is positive and negative with a positive difference. Thus, this indicates that the vector must be on the positive side of the II axis and quite oblique, approaching toward the vertical, as the current force is relatively weak. Lead III has a QRS deflection which is negative and strong. Thus, this indicates that the vector must be on the negative side of the III axis and nearly parallel thereto. When the QRS arm 13 is positioned as shown, the recorded deflections, according to their lead axes, are properly indicated and the vector arm represents the proper combined QRS for the three leads of the frontal plane.

In a similar manner the T vector arm 12 can be set on the base plate and also the S-T vector arm 11. These settings will be as shown in Figures 3 and 7. It will be noted that the T deflections for the three leads are negative in I and positive in II and III. Both I and III are quite strong current forces and therefore the vectors will be oblique toward parallel with the lead axis. Thus, the setting shown for arm 12 will be the proper vector to represent the T for the three leads of the frontal plane. Since the S-T is normally always isoelectric, the deflection is trifle. The lead I deflection is negative and relatively great, the lead II deflection is also negative, but slight, and the lead III deflection is isoelectric. The setting of vector arm 11 for S-T, as shown, represents these deflections.

With the location of the vector arms in the frontal plane, the next step is to combine the vector arms of the frontal plane with the deflections of the horizontal plane by a consideration of the transitional deflection of the chest leads which represent the horizontal plane. This will then give a visual representation of the vectors in space, which will be the final setting of the vector arms carried by the hub 18 on the rod H.

The first step in setting the vector arms 20, 21 and 22 is to select the arms to represent the QRS, T and S-T vector arm settings at the base plate. This can be done as illustrated in Figure 3 where arm 20 will represent the QRS, arm 22 the T, and arm 21 the S-T. The arms 20, 22 and 21 will be positioned to extend in the same directions, respectively, as the arms 13, 12 and 11. Thus, when the arms 20, 22 and 21 are in a horizontal plane, as shown in Figure 3, they will give, in effect, the same representation as the arms 13, 12 and 11. Thus, the upper arms, as set in Figure 3, are the same as if the lower arms were raised up the rod H to the hub 18.

After making the vector arm settings, as shown in Figure 3, the final settings of the upper arms will be made from the ECG recording of Figure 2 which are obtained from the six precordial unipolar lead electrode positions, being deflections in the horizontal plane.

Referring to Figure 2, the deflections of the six leads have their QRS, T and S-T waves indicated by the numerals 30, 31 and 32, the same as the recorded waves of Figure 1 of the frontal plane. From the Figure 2 deflections it is seen that the QRS transitional deflection is shown in the $V_4$ recording, that is, the wave changes from the bottom to the top of the posterior-anterior axis (horizontal axis). With one having knowledge of the heart and the ECG recordings, it will be known that this QRS vector arm should be tilted posteriorly and, since the transition occurs in the $V_4$ lead recording, the extent of tilting is determined. The arm 20 is therefore tilted downwardly to where its free end is horizontally opposite the $V_4$ marking on the H rod.

The transitional deflection of the T wave occurs in the $V_5$ lead recording and from a knowledge of ECG recording it is known that the spatial vector for the T is anterior and the T vector arm 22 will be tilted upwardly in the anterior direction and to an extent where its free end is horizontal with the $V_5$ marking on the H rod.

The transitional deflection of the S–T wave occurs in the $V_4$ lead recording and from the reader's expert knowledge it is known that the S–T vectors will be anterior. Thus, the S–T vector arm 21 will also be tilted upwardly and to an extent where its end is horizontally opposite the $V_4$ marking on the H rod.

After the above noted settings of the vector arms 20, 22 and 21 are made, there is visually presented a spatial vector analysis of the ECG for study. In the event of discussions between doctors, there can be no misunderstanding of the recorded electrical force conditions of the heart and what is to be interpreted therefrom. The instrument is very useful in learning the spatial method of interpretation and in better and more quickly understanding the meanings thereof. Also, it will eliminate the necessity of memorizing the "pattern" to make interpretations of the ECG.

It is to be understood that the illustrated instrument is shown by way of example only and that modifications are possible without departing from the fundamental principles involved. It is possible to eliminate the vector arms at the base plate and use only the vector arms 20, 22 and 21, as the illustrated base plate vector arms 11, 12 and 13 are primarily employed as guides for the initial setting of the arms 20, 22 and 21 in the hexaxial reference figure. It is also possible to eliminate the lower vector arms and have the upper hub 18 slidable on the rod H by unloosening the set screw 19. With such an instrument, the hub 13 will be lowered to the base plate and then the vector arms first set when they are directly over the base plate hexaxial reference figure. After this is done, the hub 18 can be raised and set in the position shown by the set screw and then the final settings of the arms made as the ECG is interpreted. I am also aware that other ways of mounting the arms to hub 18 can be employed so that these arms can have universal direction settings.

It is also to be understood that my instrument has been described in connection with an electrocardiograph employing conventional leads with bipolar electrodes for the frontal plane recordings. It can also be used with other electrocardiographs and, where unipolar limb leads are employed, the base plate is properly marked to make vector settings for the frontal plane. In the description of the use of my instrument I have only referred to the indicating of the direction of vectors, but if magnitude is desired to be indicated, such is possible by longitudinally adjusting the pointer members of the arms 20, 22 and 21 as provision has been made for this in the particular structure described.

Therefore, being aware of changes and modifications in the particular instrument disclosed, I desire it to be understood that the scope of my invention is not to be limited except in accordance with the appended claims.

What is claimed is:

1. An instrument for interpreting an electrocardiogram by the spatial vector method comprising a plate having thereon an axial reference figure for the lead axes in the frontal plane, a rod extending at right angles to the plate from the axis thereof, vector arms carried by the rod above the plate, and means for mounting said arms on the rod so that each can extend from the rod axis in any direction in any radial plane.

2. An instrument for interpreting an electrocardiogram by the spatial vector method comprising a plate having an axial reference figure for the lead axes in the frontal plane, a rod extending at right angles to the plate from the axis thereof, vector arms carried by the rod above the plate, and means for mounting said arms on the rod so that each can extend from the rod axis in any direction in any radial plane, said rod being provided with markings on each side of the mountings of the vector arms to indicate the precordial V lead electrode recordings.

3. An instrument for interpreting an electrocardiogram by the spatial vector method comprising a plate having a hexaxial reference figure, a rod extending at right angles to the plate from the axis thereof, vector arms carried by the rod above the plate, means for mounting said arms on the rod so that each can extend from the rod axis in any direction in any radial plane, and settable guide arms associated with the plate for indicating the QRS, T and S–T vectors for the frontal plane recordings.

4. An instrument for interpreting an electrocardiogram by the spatial vector method comprising a plate having an axial reference figure for the lead axes in the frontal plane, a rod extending at right angles to the plate from the axis thereof, vector arms carried by the rod above the plate, means for mounting said arms on the rod so that each can extend from the rod axis in any direction in any radial plane, and means for changing the lengths of the arms so as to indicate relative magnitude of the forces to be represented by the vector arms.

5. An instrument for interpreting an electrocardiogram by the spatial vector method comprising a base plate having an axial reference figure thereon for the lead axes in the frontal plane, a rod extending at right angles to the plate from the axis of said reference figure, three vector arms associated with the rod axis adjacent the plate and movably mounted to point in any axial direction from the rod, three other arms carried by the rod a distance above the plate, and means for mounting the last named arms on the rod so that each can extend from the rod axis in any direction in any radial plane.

6. An instrument for interpreting an electrocardiogram by the spatial vector method comprising a base plate having an axial reference figure thereon for the lead axes in the frontal plane, a rod extending at right angles to the plate from the axis of said reference figure, three vector arms associated with the rod axis adjacent the plate and movably mounted to point in any axial direction from the rod, three other arms carried by the rod a distance above the plate, and means for mounting the last named arms on the rod so that each can extend from the rod axis in any direction in any radial plane, said rod above and below the mounting of the last named arms having indicia therealong to indicate electrocardiogram recordings for the six precordial V lead electrode positions.

7. An instrument for interpreting an electrocardiogram by the spatial vector method comprising a base plate having a hexaxial reference figure thereon for the lead axes in the frontal plane, a rod extending at right angles to the plate from the axis of said reference figure, three vector arms associated wtih the rod axis adjacent the plate and movably mounted to point in any axial direction from the rod, three other arms carried by the rod a distance above the plate, comprising a hub, and means for mounting the said last named arms on the hub so that each can extend from the rod axis in any direction in any radial plane and functionally maintain said position.

8. An instrument for interpreting an electrocardiogram by the spatial vector method comprising a base plate having an axial reference figure thereon, a rod extending at right angles to the plate from the axis of said reference figure, three vector arms associated with the rod axis adjacent the plate and movably mounted to point in any axial direction from the rod, three other arms carried by the rod a distance above the plate, means for mounting the last named arms on the rod so that each can extend from the rod axis in any direction in any radial plane, and means for changing the length of the arms carried on the rod.

No references cited.